United States Patent
Choi et al.

(10) Patent No.: US 9,543,592 B2
(45) Date of Patent: Jan. 10, 2017

(54) METHOD OF MANUFACTURING ANODE CORE-SHELL COMPLEX FOR SOLID OXIDE FUEL CELL USING HYDRAZINE REDUCING AGENT AND SURFACTANT

(71) Applicant: KOREA INSTITUTE OF CERAMIC ENGINEERING AND TECHNOLOGY, Seoul (KR)

(72) Inventors: Byung Hyun Choi, Seoul (KR); Mi Jung Ji, Gwangmyeong-si (KR); Min Jin Lee, Incheon (KR); Sun Ki Hong, Seoul (KR); Young Jin Kang, Seoul (KR)

(73) Assignee: KOREA INSTITUTE OF CERAMIC ENGINEERING AND TECHNOLOGY, Seoul (KR)

( * ) Notice: Subject to any disclaimer, the term of this patent is extended or adjusted under 35 U.S.C. 154(b) by 331 days.

(21) Appl. No.: 14/089,264

(22) Filed: Nov. 25, 2013

(65) Prior Publication Data

US 2014/0342269 A1    Nov. 20, 2014

(30) Foreign Application Priority Data

May 14, 2013   (KR) .................. 10-2013-0054150

(51) Int. Cl.
  *H01M 4/90*   (2006.01)
  *H01M 4/86*   (2006.01)
  H01M 4/88   (2006.01)
  H01M 8/12   (2016.01)

(52) U.S. Cl.
  CPC .......... *H01M 4/9025* (2013.01); *H01M 4/8657* (2013.01); *H01M 4/8875* (2013.01); *H01M 4/8885* (2013.01); *H01M 2008/1293* (2013.01); *Y02E 60/50* (2013.01); *Y02E 60/525* (2013.01)

(58) Field of Classification Search
  None
  See application file for complete search history.

(56) References Cited

U.S. PATENT DOCUMENTS

2007/0110816 A1*   5/2007   Jun .................. B82Y 30/00
                                                424/490

FOREIGN PATENT DOCUMENTS

| EP | 2211405 A1 * | 7/2010 | ............ H01M 4/86 |
| KR | 10-2012-0121570 A | 11/2012 | |
| KR | 10-2013-0130541 A | 12/2013 | |

* cited by examiner

Primary Examiner — Miriam Stagg
Assistant Examiner — Carmen Lyles-Irving
(74) Attorney, Agent, or Firm — LRK Patent Law Firm

(57) ABSTRACT

Provided is a method of manufacturing an anode core-shell complex for a solid oxide fuel cell, including (A) manufacturing a stabilized zirconia (YSZ) sol by using zirconium hydroxide ($Zr(OH)_4$) and yttrium nitrate ($Y(NO_3)_3 \cdot 6H_2O$) as a starting material and distilled water as a solvent by a hydrothermal method, (B) agitating nickel chloride, stabilized zirconia in a sol state, and a surfactant, (C) adding sodium hydroxide (NaOH), (D) adjusting a pH to a range of 6 to 8, and (E) sintering the nickel-stabilized zirconia core-shell powder.

5 Claims, 3 Drawing Sheets

METHOD OF MANUFACTURING ANODE CORE-SHELL COMPLEX FOR SOLID OXIDE FUEL CELL USING HYDRAZINE REDUCING AGENT AND SURFACTANT

BACKGROUND OF THE INVENTION

1. Technical Field

The present invention relates to a method of manufacturing an anode core-shell complex for a solid oxide fuel cell using a hydrazine reducing agent and a surfactant. Particularly, core-shell powder including spherical nano-sized nickel as a core and stabilized zirconia particles as a shell is manufactured using a hydrazine reducing agent and a surfactant, and when the powder is used as an anode, nickel and stabilized zirconia are uniformly distributed and have a dense fine structure. Accordingly, an electrochemical reaction and long-term performance of the anode for the solid oxide fuel cell are improved.

2. Description of the Related Art

Currently, a demand for a novel energy source is growing in accordance with gradual depletion of fossil raw materials. A solid oxide fuel cell of directly converting chemical energy into electric energy has high energy conversion efficiency, and is capable of adopting various fuels by internal reforming thereof and being hybridized with a gas turbine to have improved efficiency. Accordingly, the solid oxide fuel cell receives attention as a next-generation energy source.

Generally, the solid oxide fuel cell has a structure where a cathode, a solid electrolyte, and an anode are sequentially laminated. Yttria-stabilized zirconia (YSZ) stabilized by adding nickel or nickel oxide is used as a typically used anode. Further, porous LSM is used as the cathode, and stabilized zirconia is used as the solid electrolyte. In the solid oxide fuel cell, oxygen provided from the cathode moves through the solid electrolyte and is electrochemically reacted with hydrogen of the anode to cause electromotive force.

A mixture of nickel or nickel oxide and yttria stabilized zirconia (8 mol % $Y_2O_3$, 92 mol % $ZrO_2$) may be simply mixed by a dry or wet method. However, since attractive forces between powders are different from each other, the two powders are not dispersed simultaneously in the same dispersion condition but agglomerate. Particularly, an agglomeration property of the nano-sized powder for reducing surface energy causes nonuniformity of a fine structure of the anode after sintering. Accordingly, a conductive path is broken or becomes a by-path to reduce electric conductivity.

Nonuniformity of distribution of crystal grains and pores by a geometric shape, a size, and the degree of agglomeration of a raw material constituting the anode negatively affects electric conductivity, fuel transmittance, coarsening of nickel, and activity of a triple phase boundary to reduce durability and an output property of an end cell. A heat cycle, a long-term operation, and oxidation and reduction reactions at the anode reduce coarsening of nickel and a reaction area of the triple phase boundary formed of nickel, stabilized zirconia, and the pore. Therefore, electrochemical activity is reduced. Finally, there is a problem in that an output of the end cell is reduced.

Efforts have been continuously made to solve the problem. Korean Patent Application Publication No. 2012-0121570 discloses a technology of manufacturing anode powder having improved long-term stability, heat cycle stability, redox stability, and mechanical properties according to suppression of a volume shrinkage in a reduction atmosphere by mixing nickel (Ni) metal powder used as a core and stabilized zirconia powder used as a shell at a high speed to manufacture powder having a nickel-stabilized zirconia core-shell structure, and heat-treating the manufactured powder at 1300 to 1500° C. to form a nano-complex structure in which crystal grains of nickel and stabilized zirconia have a uniform nano size and a continuous network therebetween.

As a method of manufacturing the solid oxide fuel cell, in the case of a planar type, generally, a method of forming a support layer electrolyte or an anode supporting a shell by tape forming or extrusion forming, laminating another constitution component thereon by tape forming or coating a slurry, and performing firing at high temperatures to manufacture the solid oxide fuel cell is performed. In this case, generally, a method of firing at least two of constitution materials such as the anode, the electrolyte, and the cathode together at high temperatures is performed in order to simplify a manufacturing process and reduce a manufacturing cost. In the case of a tubular type, each slurry of materials constituting the electrode and the electrolyte is applied on a tubular support, and then fired at high temperatures to manufacture the solid oxide fuel cell.

The present applicant has filed an application with Korean Patent Application No. 2012-0054442 entitled "a method of manufacturing a nickel/stabilized zirconia core-shell complex where metal ions for a solid oxide fuel cell anode are solid-solved" relating to a method of manufacturing a metal-solid-solved nickel/stabilized zirconia core-shell complex for a fuel cell, in which a known nickel-stabilized zirconia mixture having excellent electrical conductivity and mechanical strength was used, a small amount of metal such as cobalt, iron, copper, and chrome was solid-solved to lower a carbon deposition ratio in a methane atmosphere, and a core-shell structure was provided to further improve stability at high temperatures.

The present inventors invented a method of manufacturing a core-shell complex and a uniform mixture using a hydrazine reducing agent and a surfactant in order to improve performance of a solid oxide fuel cell through a subsequent study, thereby accomplishing the present invention.

SUMMARY OF THE INVENTION

The present invention has been made in an effort to provide a method of manufacturing a core-shell complex which includes spherical nano-sized nickel having densely distributed and uniformly mixed particles as a core and stabilized zirconia as a shell so that deformation due to coarsening and shrinkage of nickel is prevented and a sintering property, electrical conductivity, and durability are improved when an anode is operated over a long period of time at high temperatures using a hydrazine reducing agent and a surfactant.

Further, the present invention has been made in an effort to provide a method of manufacturing a core-shell complex including nickel as a core having a uniform size and stabilized zirconia as a shell to solve an agglomeration ability as a problem of nano-sized particles by adding stabilized zirconia in a sol state and a surfactant when nano-sized spherical nickel is manufactured by a hydrazine reducing method.

An exemplary embodiment of the present invention provides a method of manufacturing an anode core-shell complex for a solid oxide fuel cell. The method includes (A) manufacturing a stabilized zirconia (YSZ) sol by using zirconium hydroxide ($Zr(OH)_4$) and yttrium nitrate ($Y(NO_3)_3.6H_2O$) as a starting material and distilled water as a solvent by a hydrothermal method, (B) agitating nickel chloride, stabilized zirconia in a sol state, and a surfactant to uniformly mix nickel chloride, stabilized zirconia, and the surfactant, such that the surfactant having a polymer structure surrounds particles of a nickel precursor generated when hydrazine ($N_2H_4$) is added and stabilized zirconia due to electrostatic attractive force to prevent the particles from being agglomerated and uniformly disperse the particles, (C) adding sodium hydroxide (NaOH) to chain-adsorb hydrophobic chain groups due to attractive force of the hydrophobic chain groups of the surfactant adsorbed on surfaces of the nickel precursor and stabilized zirconia and to attach nickel precipitated from the nickel precursor and uniformly distributed and stabilized zirconia, (D) adjusting a pH to a range of 6 to 8 and performing agitation for 4 to 12 hours to reinforce an adsorption ability of the hydrophobic chain groups of the surfactant to manufacture a nickel/stabilized zirconia core-shell complex having a dense structure, and (E) manufacturing a nickel-stabilized zirconia core-shell powder into pellets and then sintering the nickel-stabilized zirconia core-shell powder at high temperatures.

Cetyltrimethyl ammonium bromide (CTAB) may be used as the surfactant of the agitating of nickel chloride, stabilized zirconia in the sol state, and the surfactant while being added at a concentration not exceeding a critical micelle concentration (CMC).

In the agitating of nickel chloride, stabilized zirconia in the sol state, and the surfactant, and the adding of sodium hydroxide, a reaction time after sodium hydroxide (NaOH) is added and until a reaction is finished may be adjusted to 5 to 180 minutes to perform the reaction.

The stabilized zirconia sol may be synthesized by using $Zr(OH)_4$ and $Y(NO_3)_3.6H_2O$ as the starting material, setting a ratio to 92:08%, and using distilled water as the solvent by the hydrothermal method.

In the agitating of nickel chloride, stabilized zirconia in the sol state, and the surfactant, and the adding of sodium hydroxide, a ratio of nickel chloride ($NiCl_2.6H_2O$), hydrazine hydrate ($N_2H_4.H_2O$), and sodium hydroxide (NaOH) as the starting material involved in the reaction may be a molar ratio of 1:2 to 10:2 to 12.

A nickel/stabilized zirconia core-shell complex for a fuel cell may be manufactured by the method of manufacturing the anode core-shell complex for the solid oxide fuel cell.

When a nickel/stabilized zirconia core-shell complex manufactured according to a manufacturing method of the present invention is used as a SOFC anode, the nickel/stabilized zirconia core-shell complex has advantages such as enlargement of a triple phase boundary, and improvement of a fine structure, a sintering property, and strength due to uniform arrangement and even distribution of particles. Accordingly, a reduction in performance of a cathode is suppressed, and an output and long-term stability of an end cell are improved. Further, since the complex behaves in a single phase, it is easy to disperse slurry, and thus the complex is easily applied to processes such as tape casting and screen printing.

DETAILED DESCRIPTION

Figure 1:
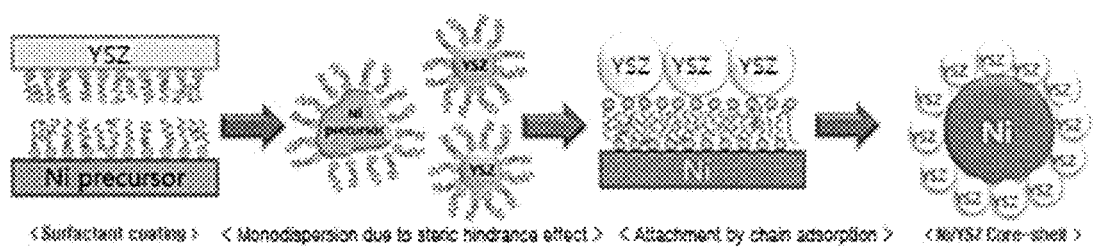
FIG. 1 is a schematic view showing a principle that nickel/stabilized zirconia (YSZ) form a core-shell structure by using a property of a surfactant.

Hereinafter, the present invention will be described in detail.

According to the present invention, there is provided a method of manufacturing a nickel/stabilized zirconia core-shell complex for a anode of a fuel cell, which includes (A) manufacturing stabilized zirconia (YSZ) in a state of a sol synthesized by a hydrothermal method by using zirconium hydroxide ($Zr(OH)_4$) and yttrium nitrate ($Y(NO_3)_3.6H_2O$) as a starting material and distilled water as a solvent, (B) agitating nickel chloride, stabilized zirconia in a sol state, and a surfactant to uniformly mix nickel chloride, stabilized zirconia, and the surfactant, such that the surfactant having a polymer structure surrounds particles of a nickel precursor generated when hydrazine ($N_2H_4$) is added and stabilized zirconia due to electrostatic attractive force to prevent the particles from being agglomerated and uniformly disperse the particles, in order to use a hydrazine synthesis method, (C) adding sodium hydroxide (NaOH) to chain-adsorb hydrophobic chain groups due to attractive force of the hydrophobic chain groups of the surfactant adsorbed on surfaces of the nickel precursor and stabilized zirconia and to attach nickel precipitated from the nickel precursor and uniformly distributed and stabilized zirconia, (D) adjusting a pH to a range of 6 to 8 and performing agitation for 4 to 12 hours to reinforce an adsorption ability of the hydrophobic chain groups of the surfactant to manufacture a nickel/stabilized zirconia core-shell complex having a dense structure, and (E) manufacturing a nickel-stabilized zirconia core-shell powder into pellets and then sintering the nickel-stabilized zirconia core-shell powder at high temperatures.

According to an exemplary embodiment, first, zirconium hydroxide ($Zr(OH)_4$), yttrium nitrate ($Y(NO_3)_3.6H_2O$), and distilled water are mixed and then put into molten metal to manufacture stabilized zirconia in the state of the sol synthesized by the hydrothermal method. Next, the manufactured nickel chloride, stabilized zirconia sol, and surfactant are agitated. Subsequently, an initial temperature and a pH of the aforementioned mixture are adjusted, and hydrazine ($N_2H_4$) is put at a predetermined speed. In addition, sodium hydroxide (NaOH) is put to precipitate nickel. The pH is adjusted to about 6 to 8 by using a hydrochloric acid (HCl) diluted solution and agitation is performed for 4 to 12 hours to reinforce the adsorption ability of the surfactant. The synthesized solution agitated for a predetermined time is washed by water and dried. The manufactured nickel-stabilized zirconia core-shell powder is manufactured into the pellets, and then sintered at high temperatures to manufacture the complex where nickel/stabilized zirconia are uniformly and continuously linked.

In the present invention, stabilized zirconia in the sot state manufactured by using the hydrothermal method is used to increase a dispersion ability of nano-sized particles to reduce agglomeration. More specifically, stabilized zirconia (YSZ) in the sol state is synthesized by using zirconium hydroxide ($Zr(OH)_4$) and yttrium nitrate ($Y(NO_3)_3.6H_2O$) as the starting material and distilled water as the solvent by the hydrothermal method. Stabilized zirconia (YSZ) is manufactured in the sol state to reduce agglomeration of the nano-sized particles.

It is preferable that cetyltrimethyl ammonium bromide (CTAB) be used as the surfactant of step (B) in a predetermined amount not exceeding a critical micelle concentration (CMC). In this case, it is preferable to use a sonicator to physically disperse nickel chloride, stabilized zirconia, and the surfactant in step (B).

The hydrazine synthesis method is a method of manufacturing nickel by using nickel chloride as the starting material. However, in the present invention, nickel chloride, the surfactant, and yttria stabilized zirconia are put together from the beginning to perform synthesis so that an area and a probability of reaction sites are increased by using a property of the surfactant to form a core-shell structure including nickel and stabilized zirconia. Herein, hydrazine hydrate is used as a reducing agent to form the nickel precursor by nickel chloride. Sodium hydroxide is used as a precipitator to precipitate nickel from nickel chloride. In steps (B) and (C), it is preferable that nickel chloride ($NiCl_2.6H_2O$) as the starting material involved in the reaction, hydrazine hydrate ($N_2H_4.H_2O$) as the reducing agent, and sodium hydroxide (NaOH) as the precipitator be reacted at a molar ratio of 1:2 to 10:2 to 12

It is preferable that a reaction time after sodium hydroxide (NaOH) is added and until a reaction is finished be adjusted to 5 to 180 minutes to perform the reaction.

The surfactant having the polymer structure surrounds surfaces of the particles of the nickel precursor and stabilized zirconia, and thus the particles are not agglomerated but uniformly monodispersed. The hydrophobic chain groups are chain-adsorbed due to attractive force of the hydrophobic chain groups of the surfactant adsorbed on the surfaces of the nickel precursor and stabilized zirconia. Nickel precipitated from the nickel precursor and uniformly distributed and stabilized zirconia are attached to each other. Subsequently, the pH is adjusted to the range of 6 to 8 by using a buffer solution and agitation is performed for 4 hours or more to increase the adsorption ability of the chain groups of the surfactant. Accordingly, the nickel/stabilized zirconia core-shell complex for the fuel cell, in which stabilized zirconia is densely adsorbed to surround the circumference of nickel, is manufactured (FIG. 1).

The manufactured complex powder having the core-shell structure of nickel and stabilized zirconia may be molded to manufacture the pellets, and then reduced and sintered to be applied to the anode of the fuel cell. Nickel/stabilized zirconia do not require a separate reducing process during sintering at high temperatures.

EXAMPLE

A better understanding of the present invention may be obtained in light of the following Examples which are set forth to illustrate, but are not to be construed to limit the present invention.

Preparation Example 1

Manufacturing of the Yttria Stabilized Zirconia (YSZ) Sol

In the present invention, stabilized zirconia (YSZ) in a sol state was manufactured by using the hydrothermal method to reduce agglomeration of the nano-sized particles. The hydrothermal method was used to synthesize stabilized zirconia in the sol state. Zirconium hydroxide ($Zr(OH)_4$), yttrium nitrate ($Y(NO_3)_3.6H_2O$), and distilled water were added, put into the autoclave, and reacted at 200° C. for 8 hours.

Example 1

Manufacturing of the Ni—YSZ Complex Powder 1 mole of nickel chloride hydrate and stabilized zirconia (YSZ) in the sol state manufactured in Preparation Example 1 were added at a predetermined ratio ($NiCl_2$:YSZ=1:0.1 to 1), 0.01 to 0.5 mole of cetyltrimethyl ammonium bromide (CTAB) was mixed at a concentration not exceeding the critical micelle concentration, and dispersed by using the sonicator. The hydrazine hydrate was added as the reducing agent at a predetermined speed to precipitate nickel from nickel chloride in the dispersed mixture solution. Sodium hydroxide (NaOH) was used as the precipitator. In this case, the reaction molar ratio of $NiCl_2.6H_2O:N_2H_4.H_2O:NaOH$ was set to 1:2 to 10:2 to 12.

The reaction time after sodium hydroxide (NaOH) used as the precipitator was added and until the reaction was finished was adjusted to 5 to 180 minutes.

Example 2

Manufacturing of the Ni—YSZ Complex Powder

After synthesis was performed like Example 1, the pH was adjusted to 6 to 8 by using the hydrochloric acid (HCl) buffer solution and agitation was performed for about 4 to 12 hours to increase the hydrophobic adsorption ability of the chain group of the surfactant. After agitation, the particles were recovered and dried in the drier for 24 hours to synthesize the complex of nickel and stabilized zirconia having the core-shell structure.

Example 3

Sintering of the Ni—YSZ Complex Powder

The Ni—YSZ complex manufactured in Example 1 was manufactured into pellets by the high-pressure uniaxial molder, reduced, and sintered. With respect to the reduction and sintering condition, gas of 5% of $H_2$ and 95% of Ar was used to increase the temperature to 1400° C. at the rate of 5° C./min and maintain heat treatment for 2 hours.

Experimental Example 1

Confirming of Formation of the Core-Shell Structure of the Complex

Figure 2:
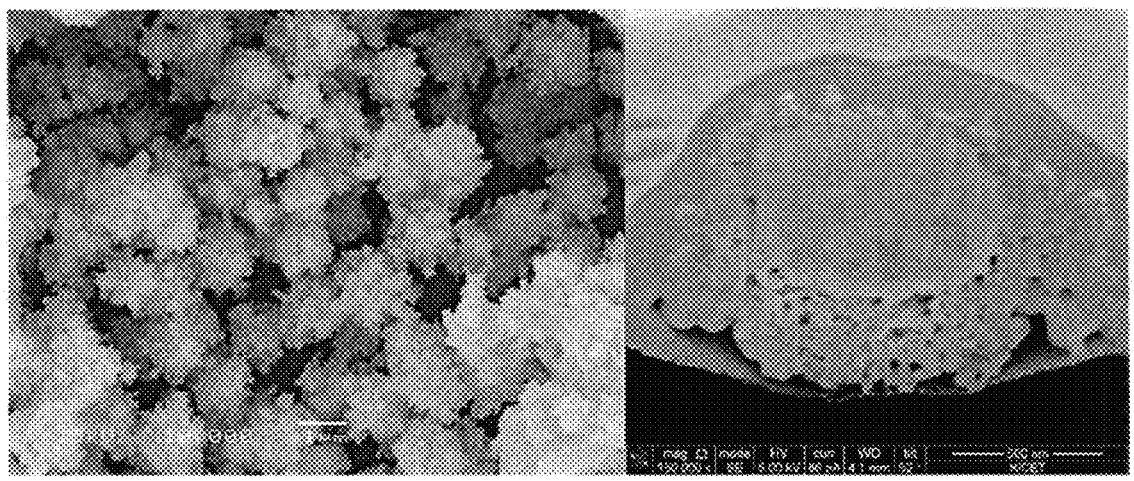
FIG. 2 is a scanning electron microscope (SEM) picture of a core-shell of nickel/stabilized zirconia (YSZ) manufactured by using a surfactant according to an exemplary embodiment of the present invention.

The analysis was performed by the scanning electron microscope (SEM) in order to confirm whether in the complex having the core-shell structure of nickel and stabilized zirconia manufactured by the aforementioned Examples, the core-shell structure is formed well. The results are shown in FIG. 2. From FIG. 2, it could be seen that the core-shell structure where stabilized zirconia is adsorbed to surround the circumference of nickel was formed.

Experimental Example 2

Confirming of Formation of the Core-Shell Structure of the Complex

Figure 3:
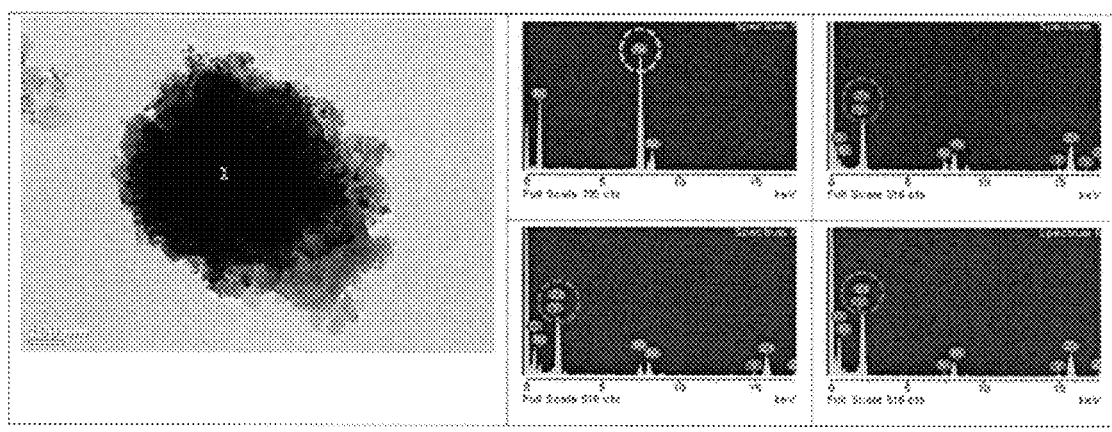
FIG. 3 is a transmission electron microscope (TEM) picture of a core-shell particle of nickel/stabilized zirconia (YSZ) manufactured by using the surfactant according to the exemplary embodiment of the present invention.

Formation of the core-shell structure of the complex of nickel and stabilized zirconia manufactured by the aforementioned Examples was confirmed by the transmission electron microscope (TEM). In FIG. 3, the core-shell particles were observed by using the transmission electron microscope (TEM), and it could be confirmed that surrounding polygonal small particles were attached to nickel particles at the center.

What is claimed is:

1. A method of manufacturing an anode core-shell complex for a solid oxide fuel cell, comprising:
    manufacturing a stabilized zirconia (YSZ) sol by using zirconium hydroxide ($Zr(OH)_4$) and yttrium nitrate ($Y(NO_3)_3.6H_2O$) as a starting material and distilled water as a solvent by a hydrothermal method;
    agitating nickel chloride, stabilized zirconia in a sol state, and a surfactant to uniformly mix nickel chloride, stabilized zirconia, and the surfactant, such that the surfactant having a polymer structure surrounds particles of a nickel precursor generated when hydrazine ($N_2H_4$) is added and stabilized zirconia due to electrostatic attractive force to prevent the particles from being agglomerated and uniformly disperse the particles;
    adding sodium hydroxide (NaOH) to chain-adsorb hydrophobic chain groups due to attractive force of the hydrophobic chain groups of the surfactant adsorbed on surfaces of the nickel precursor and stabilized zirconia and to attach nickel precipitated from the nickel precursor and uniformly distributed and stabilized zirconia;
    adjusting a pH to a range of 6 to 8 and performing agitation for 4 to 12 hours to reinforce an adsorption ability of the hydrophobic chain groups of the surfactant to manufacture a nickel/stabilized zirconia core-shell complex having a dense structure; and
    manufacturing a nickel-stabilized zirconia core-shell powder into pellets and then sintering the nickel-stabilized zirconia core-shell powder.

2. The method of claim 1, wherein cetyltrimethyl ammonium bromide (CTAB) is used as the surfactant of the agitating of nickel chloride, stabilized zirconia in the sol state, and the surfactant while being added at a concentration not exceeding a critical micelle concentration (CMC).

3. The method of claim 1, wherein in the agitating of nickel chloride, stabilized zirconia in the sol state, and the surfactant, and the adding of sodium hydroxide, a reaction time after sodium hydroxide (NaOH) is added and until a reaction is finished is adjusted to 1 to 180 minutes to perform the reaction.

4. The method of claim 1, wherein the stabilized zirconia sol is synthesized by using $Zr(OH)_4$ and $Y(NO_3)_3.6H_2O$ as the starting material, setting a ratio to 92:08%, and using distilled water as the solvent by the hydrothermal method.

5. The method of claim 1, wherein in the agitating of nickel chloride, stabilized zirconia in the sol state, and the surfactant, and the adding of sodium hydroxide, a ratio of nickel chloride ($NiCl_2.6H_2O$), hydrazine hydrate ($N_2H_4.H_2O$), and sodium hydroxide (NaOH) as the starting material involved in the reaction is a molar ratio of 1:2 to 10:2 to 12.

* * * * *